3,644,308
PARTIALLY HYDROLYZED TERPOLYMERS OF DISSIMILAR VINYL ESTERS AND AN UNSATURATED CARBOXYLIC ACID AND PROCESS FOR MAKING THEM
Pieter de Carpentier, Delft, Netherlands, assignor to Shell Oil Company, New York, N.Y.
No Drawing. Filed June 20, 1969, Ser. No. 835,227
Claims priority, application Great Britain, July 15, 1968, 33,600/68
Int. Cl. C08f 27/14, 15/40
U.S. Cl. 260—80.75
7 Claims

ABSTRACT OF THE DISCLOSURE

Polymeric compounds useful as a superior baking enamel component are prepared by a process which comprises co-polymerizing (1) at least one vinyl ester of a saturated carboxylic acid, (2) at least one alpha, beta ethylenically unsaturated carboxylic acid, and (3) at least one vinyl ester of a saturated carboxylic acid having a tertiary or quaternary alpha carbon atom and partially hydrolyzing said polymerization product in an acid medium.

---

Heretofore, baking enamels (i.e. enamels, coatings of which are normally thermally dried and/or cured as a finishing step, sometimes called stoving enamels), have been prepared with alkyd resins which are polyester products of polyhydric alcohols, polybasic acids and monobasic fatty acids. Alkyd based enamles are deficient most notably in that upon polishing they suffer loss of desirable properties such as smoothness, gloss and the like.

This invention relates to a process for preparing polymeric compounds useful in preparing baking enamels which are superior in that they may be polished without apparent loss of appearance.

Specifically the invention relates to a process for preparing polymeric compounds having (1) free hydroxyl groups, (2) free carboxylic groups, and (3) acyloxy groups with a tertiary or quaternary alpha carbon atom substituted with hydrocarbyl radicals which comprises forming a copolymer of (a) at least one vinyl ester of a saturated carboxylic acid having a primary or secondary alpha carbon atom, (b) at least one alpha, beta ethylenically unsaturated carboxylic acid, and (c) at least one vinyl ester of a saturated carboxylic acid having a tertiary or quaternary alpha carbon atom and partially hydrolyzing said copolymer in an acid medium.

The invention also relates to the hydrolyzed copolymers produced in said process. Whenever the term "copolymer" is used in this specification, this should be understood as referring to a product obtained from two or more monomers and having an average molecular weight of more than 1000. The term "copolymer" includes copolymers with random arrangement of monomer units as well as block and graft copolymers. It has now been discovered that polymeric compounds particularly useful as a component of a superior stoving enamel are those having (1) a hydroxyl number between 50 and 250 milligram equivalents per 100 grams (mg. eq./100 g.), (2) an acid value between 7 and 20 milligrams of potassium hydroxide per gram (mg. KOH/g.) and from about 12 to about 85 percent by weight of acyloxy groups having a tertiary or quaternary alpha carbon atom substituted with hydrocarbyl radicals. The invention also relates to latices, solutions, paints, and adhesives containing these hydrolyzed copolymers.

The products obtained in the process of the present invention are especially suitable, e.g., as component in surface coating of high quality, that means that high requirements with respect to gloss, covering power, flexibility, fastness to light, color fastness, and applicability in spraying techniques are met. It has been found that these lacquers are very suitable to be polished without damaging the smooth appearance. Thus it is possible for instance after spraying the lacquer on a metal surface to remove irregularities or contaminations by polishing, leaving a surface which is perfectly glossy. Local damages, for instance in the coach-work of motor cars, can conveniently be repaired by spraying locally and polishing the treated spot afterwards.

The vinylesters copolymerized in the present process belong to two categories. Category (a), hereafter to be defined as "vinylesters a" "readily hydrolyzable vinylesters," comprises the vinylesters derived from saturated carboxylic acids having a primary or secondary alpha-carbon-atom. Category (b), hereafter to be defined as "vinylesters b" or "hardly hydrolyzable vinylester," comprises the vinylesters of saturated carboxylic acids having a tertiary or quaternary alpha-carbon-atom. The alpha-carbon-atom in the esters of category (b) is always branched and this structural feature accounts for the stability to hydrolysis.

Suitable ratios of the readily hydrolyzable vinylesters to the hardly hydrolyzable vinylesters, copolymerized in the copolymer, in connection with the application after hydrolysis as component of stoving enamels are between 15:85 and 85:15 and in particular between 3:1 and 1:2 (all parts by weight).

Suitable quantities of alpha, beta-ethylenically unsaturated carboxylic acids copolymerized in the copolymer are between 1 to 20 percent by weight. The content of alpha, beta-ethylenically unsaturated carboxylic acids should preferably be such, that before the hydrolysis the acid value is between 15 and 50 mg. KOH/g. copolymer.

Further it appeared, that the obtained products are suitable as component in stoving enamels in particular if after hydrolysis the content of hydroxyl groups (hydroxyl number) is between 50 and 250 mg. eq./100 g. copolymer. A hydroxyl number between these limits may be obtained by a suitable selection of the content of readily hydrolyzable vinylester groups in the copolymer and the extent of hydrolysis. The extent of hydrolysis is determined by the reaction conditions and the lapse of time during which the hydrolysis is allowed to proceed.

In addition to a hydroxyl number between the limits just mentioned an acid value in the hydrolyzed product between 7 and 20 mg. KOH/g. is desirable. It appeared that an acid value between 7 and 20 mg. KOH/g. copolymer together with a hydroxyl number between 50 and 250 mg. eq./100 g. copolymer only can be obtained, if the hydrolysis is carried out is an acid medium. It has been found that during hydrolysis the acid value decreases on account of the interreaction of hydroxyl and carboxylic groups to lactone rings and it appeared, that only if the hydrolysis is performed in acid medium, this undesirable interreaction is sufficiently controlled.

Very usable products are obtained, if the hydrolyzed copolymer displays an acid value between 10 and 15 mg. KOH/g. copolymer and a hydroxyl number between 100 and 170 mg. eq./100 g. copolymer.

An acid medium suitable for the process of the present invention may be constituted by inorganic as well as organic acids. Examples of suitable acids are sulphuric acid, phosphoric acid, hydrochloric acid and aromatic sulphonic acids, such as paratoluene sulphonic acid.

Examples of readily hydrolyzable vinylesters are vinyl acetate, vinyl propionate and vinyl butyrate and further homologues, for example vinyl palmitate and vinyl stearate. The hardly hydrolyzable vinylesters, which are vinylesters of carboxylic acids having a branched alpha-carbon atom, usually have a number of carbon atoms in the acid moiety of molecule varying between 5 and 20. Preference is given to carboxylic acids, whose carboxyl group is attached to a quaternary alpha-carbon atom, and whose number of carbon atoms varies from 5 to 12 (inclusive).

Special preference is given to vinylesters of pivalic acid (trimethylacetic acid) and of carboxylic acids having 9 or 10 carbon atoms, e.g. 1,1,3,3-tetramethylbutanecarboxylic acid, 1,2-dimethyl-1-isopropylpropanecarboxylic acid, 1,2-dimethyl-1-isobutyl propane carboxylic acid, and 1,1,4-trimethylpentanecarboxylic acid, and to mixtures of vinylesters of branched carboxylic acids with 9, 10 and 11 carbon atoms.

The carboxylic acids having a branched α-carbon atom may, for example, be obtained by reacting formic acid or carbon monoxide and water with olefins under the influence of liquid acid catalysts, such as sulphuric acid, phosphoric arid or complexes of phosphoric acid, borontrifluoride and water. As olefins in such processes mixtures of olefins are used obtained by cracking of paraffinic hydrocarbons, for example mineral oil fractions. These mixtures may contain branched as well as straight chain acyclic olefins and also cycloaliphatic olefins. When such mixtures are reacted with formic acid or with carbon monoxide and water a mixture of saturated acyclic and cycloaliphatic monocarboxylic acids is obtained. Other olefinic initial materials are, for example, isobutylene, propylene trimer, and diisobutylene. The branched carboxylic acids of mixtures thereof prepared from these hydrocarbons are exclusively acyclic.

The alpha, beta-ethylenically unsaturated carboxylic acids are preferably mono-carboxylic acids such as acrylic acid or methacrylic acid, but di- or polyvalent carboxylic acids are also included. Examples of di- or polyvalent alpha, beta-ethylenically unsaturated carboxylic acids are maleic acid and fumaric acid and also di- or polyvalent propenecarboxylic acids such as, e.g., itaconic acid and aconitic acid.

The copolymers of this invention may in addition contain a minor amount, for example less than about 10 percent by weight, preferably less than about 5 percent of an ethylenically unsaturated alcohol such as vinyl alcohol.

The polymers which are hydrolyzed in the process of the present invention are prepared by polymerization, usually in the presence of catalysts or initiators donating free radicals, such as oxygen per compounds and azo compounds. In the preparation of these polymers all the known polymerization methods, including emulsion, suspension, solution or precipitation polymerization, as well as polymerization in the absence of a solvent or diluent may be applied.

The hydrolysis is preferably carried out in emulsion. However, a hydrolysis in solution is also possible.

The ability of the hydrolyzed products prepared according to the invention to form stoving enamels in combination with formaldehyde-condensate products (for example melamine-formaldehyde resins) is based on the presence of free carboxylic groups in addition to hydroxyl groups.

As to chemical structure the hydrolyzed products of the invention are very akin to alkyd resins. Both resins contain free hydroxyl and carboxylic groups as well as branches constituted by hydrocarbon radicals attached to carboxylic groups. When comparing the stoving enamels based on both resins it appears, however, that the products of the invention are very superior to those based on alkyd resins, in that the former stoving enamels may be polished.

To compose lacquers based on the hydrolyzed products of the invention a concentrated solution of these products in a suitable solvent is prepared, which is mixed with a pigment to a paste. This paste is thereafter mixed with a formaldehyde condensation product. A suitable solvent for the hydrolyzed products is a mixture of xylene and n-butanol, for example in a weight ratio 5:1. The concentration of the hydrolyzed product in the solution may be very high, e.g. about 50% by weight. As a rule the weight ratio of pigment (e.g. rutile, $TiO_2$ to hydrolyzed product is not more than 1:2. The paste is usually diluted with the solvent until the content of solids is between 30 and 60% by weight. The weight ratio to which the pastes are mixed with the formaldehyde condensation product varies usually from 90:10 to 50:50.

EXAMPLE

Preparation of the copolymers

A round bottom flask of 2 l. equipped with a reflux condenser was charged with:

|  | G. |
|---|---|
| Vinylacetate | 426.4 |
| Mixture of vinylesters of saturated monocarboxylic acids having 9–11 carbon-atoms and branched at the alpha-carbon atom (VeoVa 911®) | 213.6 |
| Cyclohexane | 693.6 |
| Benzene | 94.1 |
| Benzoyl peroxide | 7.6 |

The mixture was boiled during 6 hours in a nitrogen atmosphere under gradual addition of a solution of 27.3 g. acrylic acid in 173 g. benzene. Boiling was continued hereafter during half an hour, whereupon the reaction mixture was cooled to room temperature. The diluent was thereupon distilled off under heating up to 60° C., finally under vacuum.

When the reaction was carried out under these conditions a copolymer was obtained with an acid value of 27. By means of a proportional reduction or enlargement of the quantity of acrylic acid also copolymers with lower or higher acid numbers respectively may be obtained.

Hydrolysis

A round-bottom flask of 250 cg. was charged with:

50 g. copolymer (together with 2 g. solvent remaining from the preparation of the copolymer)
50 g. water
0.193 sodium alkylbenzenesulphonate as emulsifying agent.

After heating to reflux temperature (100° C.) a solution of 0.832 g. paratoluenesulphonic acid in 15 g. water was added. The mixture was boiled during several hours and thereafter cooled to room temperature. The waterphase was removed, the residue was dissolved in tetrahydrofuran, whereupon the solution was poured into water, so that the hydrolyzed product was separated again. After decantation the product was dissolved in acetone and again the solution was poured into water to separate the product. After removing again a substantial portion of the water by decantation the mixture was subjected to azeotropic distillation with xylene. A clear solution of the hydrolyzed product in xylene was obtained.

In Table I some properties of the products, obtained under variation of the duration of the hydrolysis, are collected.

TABLE I

| Hours | OH mg. eq./100 g. | Acid value, mg. KOH/g. | Viscosity of a 45% solution in xylene at 20° C., stokes |
|---|---|---|---|
|  | 0 | 27 | 6.27 |
| 2½ | 74.4 | 14.5 | 11.8 |
| 3 | 97.8 | 13.0 | 15.3 |
| 3½ | 133.6 | 12 | 36 |

The determination of hydroxyl groups was carried out as follows: A weighed quantity of sample was treated with a known amount of an acetic anhydride-pyridine mixture, and subsequently back-titrated with standard potassium hydroxide solution. A correction was applied for the acid present in the sample, while the results were calculated on the basis of dry resin by taking into account the solids content of the sample. The total acidity of the sample was determined by making a blank test, omitting the acetic anhydride.

Preparing of stoving enamels

By rotation in a ball mill during 16 hours two pastes, I and II, were made consisting of:

|  | I, grams | II, grams |
|---|---|---|
| Rutile ($TiO_2$) | 100 | 100 |
| A 51.65% solution of hydrolyzed copolymer (acid value 11.9; hydroxyl content 133.6) in xylene/butanol (5:1) | 271.1 | 309.8 |
| n-Butanol | 26 | 29.4 |
| Xylene | 86 | 86 |

The pastes were worked up into stoving enamels by mixing them with formaldehyde-melamine resin, adding xylene to attain spraying viscosity. Paste I was mixed with the resin to obtain a ratio hydrolysis product: resin=70:30, Paste II was mixed with the resin to obtain a ratio hydrolysis product: resin=80:20.

The resulting lacquers were applied to panels and stoved according to the conditions shown in Table II, after which the properties were determined. The lacquers withstood polishing very well, leaving the desired perfectly glossy surface.

TABLE II

| Stoving schedule | Ratio of hydrolysis product: resin | | | | | | | |
|---|---|---|---|---|---|---|---|---|
|  | 80/20 | 70/30 | 80/20 | 70/30 | 80/20 | 70/30 | 80/20 | 70/30 |
|  | 30 minutes at 120° C. | | 30' at 120° C. plus 20' at 140° C. | | 30' at 120° C. plus 5% acid catalyst | | 30' at 120° C. plus 5% acid catalyst plus 20' 140° C. | |
| Gloss under 45°, percent | 88 | 88 | 85 | 85 | 92 | 95 | 86 | 86 |
| Buchholz hardness | 87 | 91 | 91 | 95 | 87 | 91 | 91 | 95 |
| Erichsen impact: |  |  |  |  |  |  |  |  |
| Direct, mm | 6.5 | 4.5 |  |  | 6 | 4.5 |  |  |
| Reverse, mm | <0.5 | <0.5 |  |  | 0.5 | <0.5 |  |  |
| Conical mandrel percent[1] | 86 | 81 |  |  | 90 | 81 |  |  |
| Erichsen, slow penetration, mm | 7.5 | 6 |  |  |  |  |  |  |
| Adhesion[2] | 9 | 8.9 |  |  | 9 | 9 |  |  |
| Xylene resistance[3] | 4-5 | 4-5 |  |  | 4-5 | 5 |  |  |
| Color |  |  | n.c. | n.c. |  |  | n.c. | n.c. |

[1] ASTM D 522-60.
[2] DIN 53151.
[3] 15 minutes after the xylene is applied, the surface is probed with a pencil of "F" hardness. Ratings are given on a scale of 0-10; 0 denotes no resistance, 10 denotes complete resistance.
5 denotes moderate resistance.

NOTE.—n.c.=No change.

I claim as my invention:

1. A process for preparing partially hydrolyzed polymeric compounds containing (1) free hydroxyl groups, (2) free carboxylic groups and (3) acryloxy groups having a tertiary or quaternary alpha carbon atom substituted with hydrocarbyl groups which comprises copolymerizing (a) a vinyl ester of a saturated carboxylic acid having a primary or secondary alpha carbon atoms, (b) an alpha, beta ethylenically unsaturated carboxylic acid and (c) at least one vinyl ester of a saturated carboxylic acid having a tertiary or quaternary alpha carbon atom to form a random copolymer wherein the weight ratio of vinyl ester of saturated carboxylic acids having a primary or secondary alpha carbon atom to vinyl esters of saturated carboxylic acids having a tertiary or quaternary alpha carbon atom is between 3:1 and 1:2 and the quantity of alpha, beta ethylenically unsaturated carboxylic acid polymerized in the copolymer is between 1 and 20 percent by weight, and partially hydrolyzing said copolymer in an acid medium whereby the product has a hydroxyl value between 50 and 250 milligram equivalents/100 g. and an acid value between 7 and 20 mg. KOH/g.

2. A process as in claim 1 wherein the vinyl ester of a saturated carboxylic acid, having a tertiary or quaternary alpha carbon atom has in the acid moiety of the molecule between 5 and 20 carbon atoms.

3. A process as in claim 2 wherein the vinyl ester of a saturated carboxylic acid having a tertiary or quaternary carbon atom is a mixture of vinyl esters of branched carboxylic acids selected from the group consisting of branched carboxylic acids with 9, 10 and 11 carbon atoms.

4. A process as in claim 1 wherein the alpha, beta ethylenically unsaturated carboxylic acid is acrylic or methacrylic acid.

5. A partially hydrolyzed random copolymer consisting essentially of (1) at least one vinyl ester of a saturated carboxylic acid having a primary or secondary alpha atom, (2) between 1 and about 20 percent by weight of an ethylenically unsaturated carboxylic acid, and (3) at least one vinyl ester of a saturated carboxylic acid having a tertiary or quaternary carbon atom, the weight ratio between the vinyl ester of (1) and (3) is between 15:85 and 85:15 and having a hydroxyl number between 50 and 250 milligram equivalents per 100 grams of a copolymer and an acid value between 7 and 20 milligrams of potassium hydroxide per gram.

6. A partially hydrolyzed copolymer as in claim 5 having an acid value between 10 and 15 mg. KOH per gram of copolymer and a hydroxyl number between 100 and 170 milligram equivalents per 100 grams of copolymer.

7. A partially hydrolyzed copolymer as in claim 5 wherein said vinyl ester of a saturated carboxylic acid having a primary or secondary alpha carbon atom is vinyl acetate, said ethylenically unsaturated carboxylic acid is acrylic, and said vinyl ester of a saturated carboxylic acid haxing a tertiary or quaternary atom is a mixture of vinyl esters of branched carboxylic acids of 9, 10 and 11 carbon atoms.

References Cited

UNITED STATES PATENTS

| 3,455,887 | 7/1969 | Levine | 260—78.5 |
| 3,470,125 | 9/1969 | Sliwka et al. | 260—29.6 |
| 3,503,916 | 3/1970 | Warson et al. | 260—29.6 |

JOSEPH L. SCHOFER, Primary Examiner

S. M. LEVIN, Assistant Examiner

U.S. Cl. X.R.

260—33.6 UA, 39 R, 41 B, 78.5 T, 844, 885